(12) United States Patent
Heyduck et al.

(10) Patent No.: US 11,578,513 B2
(45) Date of Patent: Feb. 14, 2023

(54) HANDLE DEVICE FOR A MOTOR VEHICLE DOOR

(71) Applicant: DAIMLER AG, Stuttgart (DE)

(72) Inventors: Jan Heyduck, Sindelfingen (DE); Juergen Jooss, Boeblingen (DE); Martin Lindmayer, Sulz (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 454 days.

(21) Appl. No.: 16/760,347

(22) PCT Filed: Jun. 20, 2018

(86) PCT No.: PCT/EP2018/066462
§ 371 (c)(1),
(2) Date: Apr. 29, 2020

(87) PCT Pub. No.: WO2019/086148
PCT Pub. Date: May 9, 2019

(65) Prior Publication Data
US 2021/0156178 A1 May 27, 2021

(30) Foreign Application Priority Data
Oct. 30, 2017 (DE) .................. 10 2017 010 196.5

(51) Int. Cl.
*E05B 85/10* (2014.01)
*E05B 81/06* (2014.01)
*B60J 5/04* (2006.01)

(52) U.S. Cl.
CPC ........... *E05B 85/107* (2013.01); *B60J 5/0463* (2013.01); *E05B 85/10* (2013.01); *E05B 85/103* (2013.01)

(58) Field of Classification Search
CPC ....... E05B 85/10; E05B 85/103; E05B 85/107
See application file for complete search history.

(56) References Cited

U.S. PATENT DOCUMENTS 4,093,289 A * 6/1978 Inabayashi .............. E05B 81/25
292/201
4,573,723 A * 3/1986 Morita .................... E05B 81/25
70/279.1
(Continued)

FOREIGN PATENT DOCUMENTS

CN 101514596 A 8/2009
CN 105683468 A 6/2016
(Continued)

OTHER PUBLICATIONS

Office Action dated Nov. 24, 2020 in related/corresponding CN Application No. 201880070712.7.
(Continued)

*Primary Examiner* — Carlos Lugo
(74) *Attorney, Agent, or Firm* — Patent Portfolio Builders PLLC

(57) ABSTRACT

A handle device for a motor vehicle door includes a door handle, which is hinged at both ends to an electrically driven movement kinematic system. A first end of the door handle is rotatable outwards via a motor-operated pivot lever. A push rod is hinged to the pivot lever, the other end of which is hinged to a locking lever, which acts on a toggle lever pair. One end of a first toggle lever is mounted on the housing side and one end of a second toggle lever is hinged to a second end of the door handle. The locking lever is designed, in a standby position, to block a movement of the door handle back into a rest position and to permit a movement into an opening position.

14 Claims, 4 Drawing Sheets

(56) References Cited

U.S. PATENT DOCUMENTS

Figure 1:
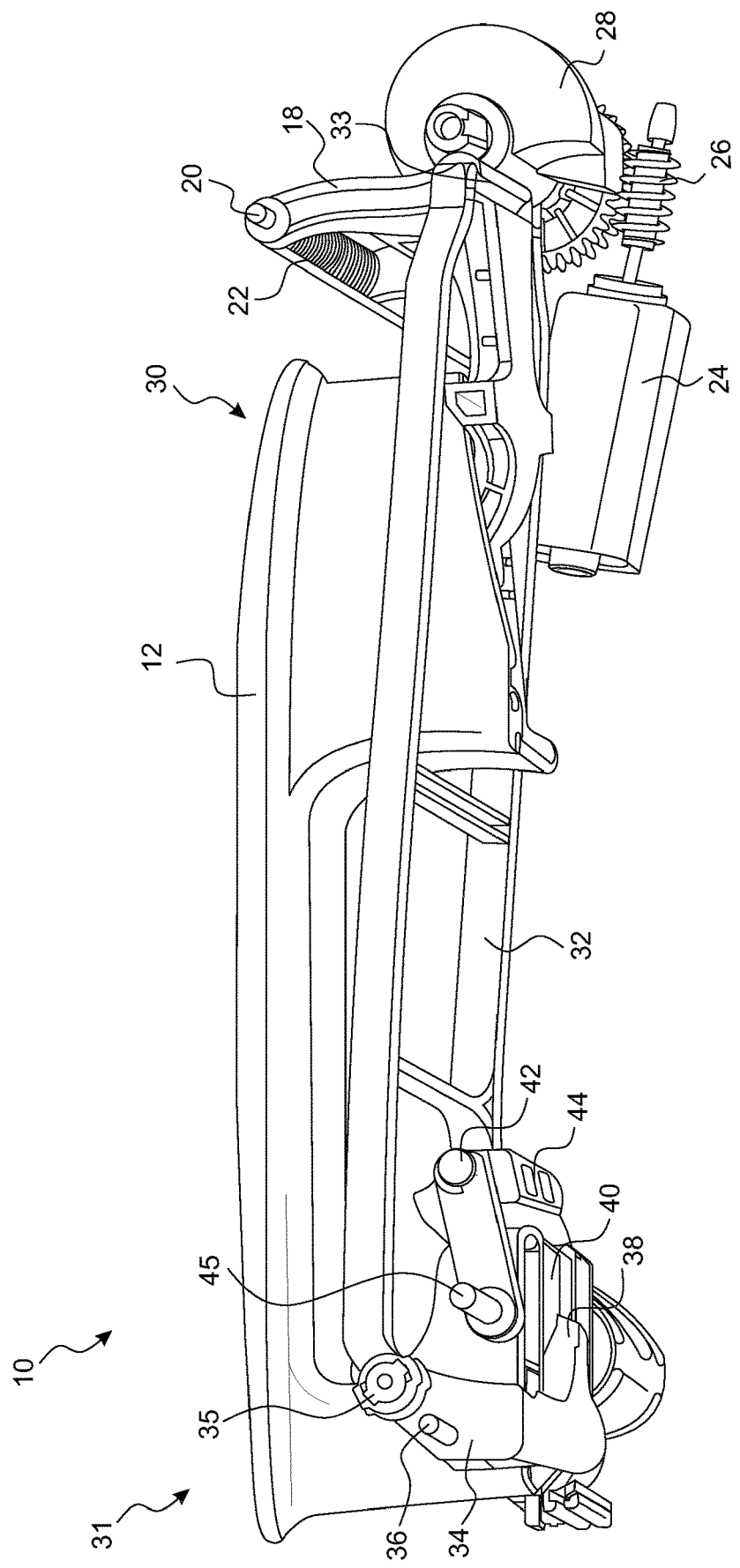

| | | | |
|---|---|---|---|
| 5,123,687 A | 6/1992 | Pfeiffer et al. | |
| 6,474,119 B1 | 11/2002 | Halvorson et al. | |
| 7,621,573 B2 | 11/2009 | Thomas et al. | |
| 9,605,452 B2* | 3/2017 | Yoshino | E05B 85/107 |
| 10,550,611 B2* | 2/2020 | Och | E05B 85/107 |
| 2011/0148575 A1* | 6/2011 | Sobecki | E05B 81/14 |
| | | | 292/336.3 |
| 2016/0281397 A1* | 9/2016 | Park | E05B 85/103 |

FOREIGN PATENT DOCUMENTS

| | | | | |
|---|---|---|---|---|
| CN | 106761062 A | | 5/2017 | |
| CN | 107269139 A | * | 10/2017 | ............ E05B 77/12 |
| CN | 107503598 A | * | 12/2017 | ............ E05B 79/06 |
| CN | 109983190 A | | 7/2019 | |
| DE | 4002963 C1 | | 7/1991 | |
| DE | 102008036426 A1 | | 5/2009 | |
| DE | 102011001001 A1 | * | 6/2012 | ........... E05B 85/103 |
| DE | 202014010524 U1 | | 2/2016 | |
| DE | 102016112689 A1 | * | 1/2018 | ............ E05B 81/76 |
| DE | 102017101418 A1 | | 7/2018 | |
| WO | WO-2017070307 A1 | * | 4/2017 | ............ E05B 77/06 |
| WO | WO-2017153088 A1 | * | 9/2017 | ............ E05B 81/06 |
| WO | 2018137840 A1 | | 8/2018 | |

OTHER PUBLICATIONS

Examination Report dated Sep. 18, 2018 in related/corresponding DE Application No. 10 2017 010 196.5.

International Search Report dated Oct. 12, 2018 in related/corresponding International Application No. PCT/EP2018/066462.

Written Opinion dated Oct. 12, 2018 in related/corresponding International Application No. PCT/EP2018/066462.

* cited by examiner

HANDLE DEVICE FOR A MOTOR VEHICLE DOOR

BACKGROUND AND SUMMARY OF THE INVENTION

Exemplary embodiments of the invention relate to a handle device for a motor vehicle door, comprising a door handle hinged at both ends to an electrically driven movement kinematic system, by means of which the door handle can be moved from a retracted rest position into an extended standby position and back, wherein in the standby position, a compressive force acting on the door handle from outside can be transmitted to the motor vehicle door, and the door handle can be moved into an opening position by means of a tensile force. Exemplary embodiments of the invention further relate to a motor vehicle door equipped therewith.

There are a number of extendable handle devices for motor vehicles. By way of example, such handle devices are described in DE 10 2008 036 426 A1 or DE 20 2014 010 524 U1. In most cases, the door handles are tilted outwards along an axis, forming a kind of protruding wing. Or there are exterior door handles in which the door handle appears to extend in parallel but is actually rotated about an axis of rotation.

Exemplary embodiments of the invention are directed to a handle device enabling a steady extension movement of the door handle, and, in an extended standby position, is thus able to absorb compressive forces or transmit them to the door and, when extended to an open position, can transmit the resulting tensile force.

According to exemplary embodiments, a first end of the door handle can be rotated outwards via a motor-operated pivot lever, a push rod is hinged to the pivot lever, the other end of which is hinged to a locking lever which acts on the door handle, wherein one end of a first toggle lever is mounted on the housing side and one end of a second toggle lever is hinged to the second end of the door handle, wherein the locking lever is designed, in the standby position, to block a movement of the door handle back into the rest position and to permit a movement into the open position.

This embodiment has the advantage that, with simple structural means, a uniform, parallel-seeming movement of the door handle between the rest position and the extended standby position is possible, wherein, in this position, an externally active pressure force is introduced into the support structure of the handle device at the same time. In addition, when the door handle is pulled, the pulling forces can be used, in addition to a push-button release, to mechanically enable a door lock to be opened, for example via a Bowden cable.

The locking lever can either push the bottom of the door handle directly from bottom to top or push against a toggle lever, which then transfers the pressure force into the door handle.

According to an advantageous embodiment, the first end of the door handle is its front end in the direction of the vehicle. This allows the door handle to rotate about the front hinge point when activated, such that a natural force flow is ensured, as the pulling direction of the door handle is thus approximately perpendicular to the axis of rotation of the vehicle door during the opening movement.

In accordance with an advantageous embodiment, the pivot lever can be rotated about a rotation axis fixed to the housing by means of a cam disc operated by a drive motor. Such a drive, which can be carried out via a toothed cam disc according to a development, is structurally simple and less susceptible to faults.

In accordance with an advantageous embodiment, the locking lever has a locking tab, which can be rotated when moving from the rest position to the standby position, wherein here the locking tab abuts on the first toggle lever in a sliding manner. The rotating range of the locking lever is preferably in the range of from 60° to 120°, particularly preferably approximately 90°.

In accordance with an advantageous embodiment, the locking tab in the standby position is aligned in the direction of the compressive force acting on the hinge point of the door handle. This ensures that the force generated when the door handle is pressed is absorbed as linearly as possible via the locking tab and transferred to its bearing without any torque arising, which could result in a partial recoil of the door handle.

In accordance with an advantageous embodiment, the first toggle lever of the toggle lever pair is designed like a crankshaft and is rotatably mounted at the free ends on the housing, wherein the second toggle lever is hinged to the middle section thereof, the second end of which is hinged to the second end of the door handle. This embodiment enables a structurally compact arrangement.

In accordance with an advantageous embodiment, the hinge points of the push rod on the pivot lever and on the locking lever are selected in such a way that a rotary movement of the pivot lever leads to a synchronous outward movement of the door handle at both ends, i.e., that the distances covered are approximately the same, such that the door handle moves during the movement from the rest position to the standby position in such a way that its outer side remains parallel to the outer skin of the vehicle door. If the lever arms are suitably dimensioned, the impression of a quasi-parallel outward movement of the door handle advantageously arises, in which the outer side of the door handle remains parallel to the outer skin of the vehicle door.

In accordance with an advantageous embodiment, when the door handle is moved from the standby position to the opening position, a pivot lever-sided hinge point of the door handle remains stationary, wherein the second end of the door handle can be rotated about the hinge point. Thus, the movement of the door handle from the standby position to the opening position is a pivot movement, which is structurally simple and stable and intuitively accommodates the movement of the user when opening the door. It is possible to attach a mechanical door opening component, in particular a Bowden cable, on the outside of the door handle with a maximum lever arm.

Exemplary embodiments of the invention further relate to a motor vehicle door comprising a handle device according to one of the aforementioned embodiments.

Further advantages, features and details arise from the following description, in which at least one exemplary embodiment is described in detail, if necessary with reference to the drawings. Identical, similar and/or functionally identical parts are provided with the same reference numerals.

BRIEF DESCRIPTION OF THE DRAWING FIGURES

Figure 2:
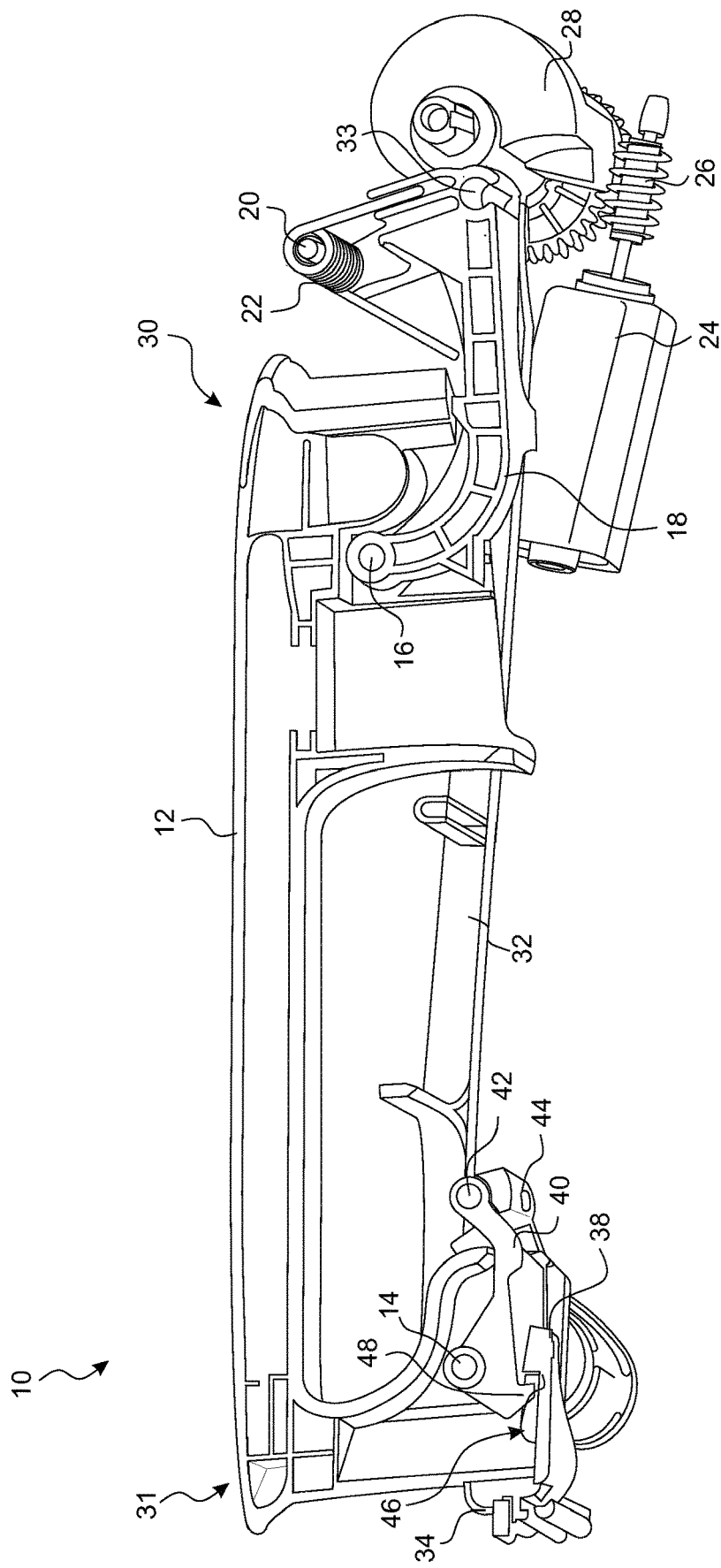
Figure 3:
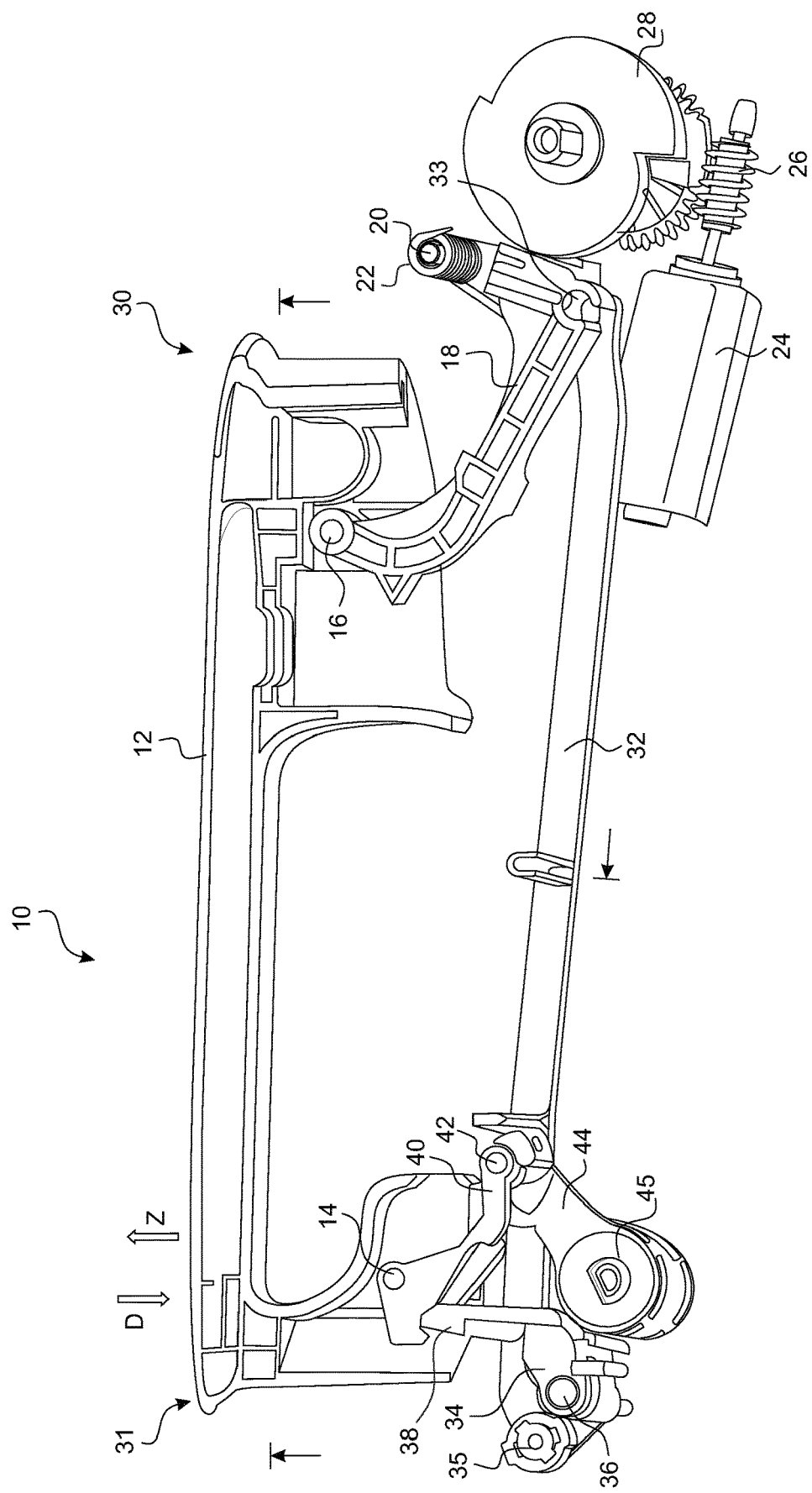
Figure 4:
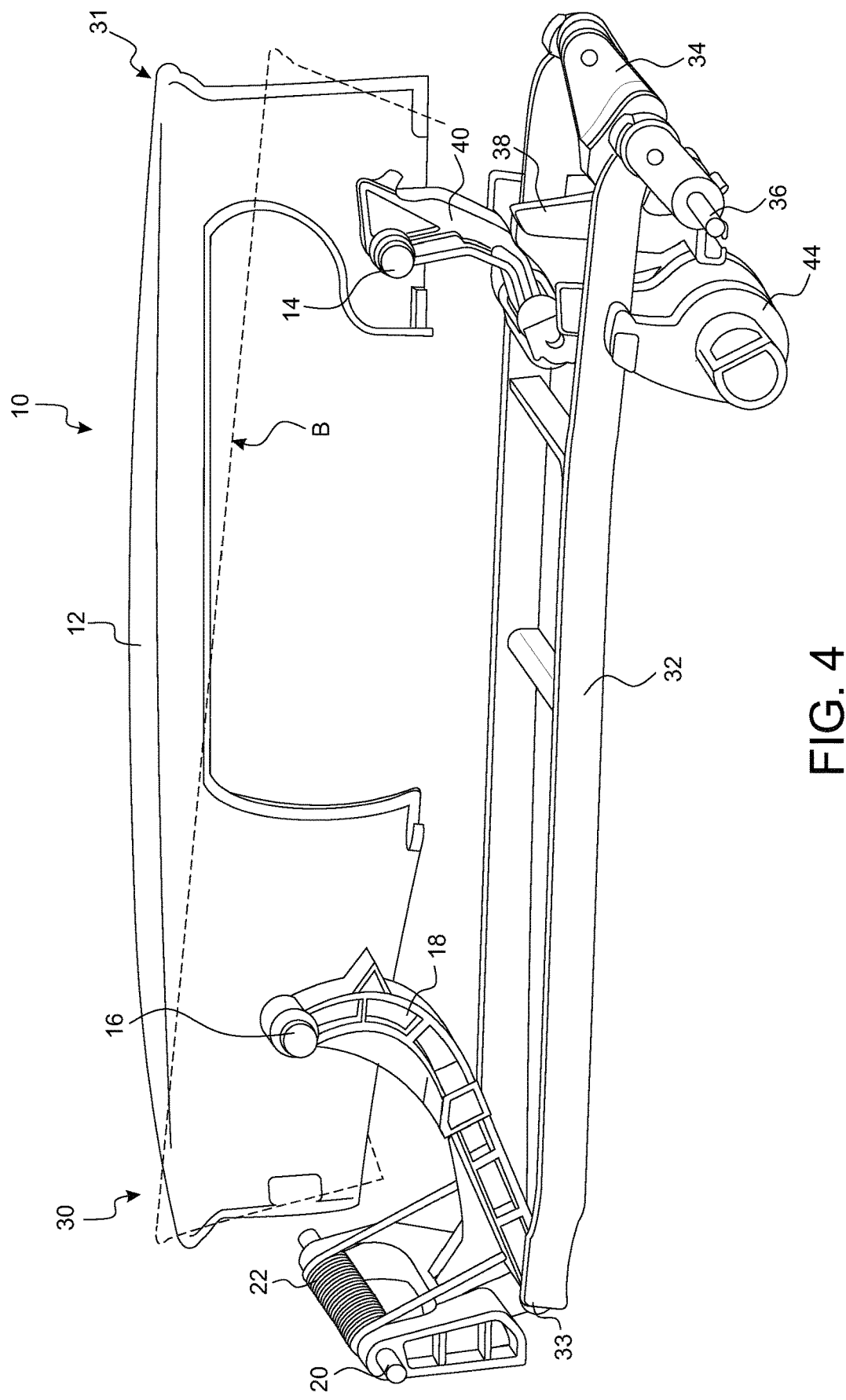

Here are shown:

FIG. 1: a perspective view of a handle device in the rest position,

FIG. 2: a longitudinally cut depiction of the handle device from FIG. 1 in the rest position, FIG. 3: the handle device according to FIGS. 1 and 2 in the standby position, and FIG. 4: the handle device of FIGS. 1 to 3 in the open position.

In FIGS. 1 and 2, a handle device 10 is depicted in a perspective view and as a longitudinal section in the rest position. The surrounding support structure, which is fixed to a bodyshell door of a vehicle, is not depicted due to reasons of clarity. In the rest position, a door handle 12 is located in a recess in the door panel of a motor vehicle door in such a way that the outer surface of the door handle 12 is flush with the door panel.

The handle device 10 substantially comprises the door handle 12, which is connected to the kinematic system described further below via a rear hinge point 14 and a front hinge point 16. The designations "rear" and "front" refer to a motor vehicle in which the handle device 10 according to the invention can be installed. The front hinge point 16 is therefore closer to the front of the vehicle than the rear hinge point 14.

The front hinge point 16 of the door handle 12 is mounted in a pivot lever 18, which can be rotated about a pivot axis 20 in the support structure (not shown). By means of a return spring 22, the pivot lever 18 is pushed into the rest position shown in FIG. 1, in which the door handle 12 occupies its lowest position in the figures, which, in the assembled state, is the innermost position (relative to the motor vehicle). The pivot lever 18 is moved by a cam disc drive which consists of a drive motor 24 having a worm gear 26 and a cam disc 28 mounted in the support structure.

In addition, a push rod 32 is hinged to the approximately U-shaped pivot lever 18 in the hinge 33. In the figures, the push rod 32 is designed as a push frame having two parallel arms for reasons of symmetrical force transmission, but a one-sided design as a rod is also possible.

The other end of the push rod 32 is hinged by means of a hinge 35 to a locking lever 34, which in turn is rotatably mounted about an axis of rotation 36 in the support structure (not shown). A locking tab 38 is formed on the locking lever 34, which is in sliding connection with a first toggle lever 40 of a toggle lever pair. The first toggle lever 40 is coupled in an articulated manner to a second toggle lever 44 via a toggle hinge 42 and is also connected to the door handle 12 in an articulated manner via the rear hinge point 14.

The locking tab 38 and the first toggle lever 40 have interlocking guides 46 as well as a locking lug 48 in order to enable a controlled force-transmitting, initially sliding movement between these components.

The second toggle lever 44 of the toggle lever pair 40, 44 is designed like a crankshaft and accordingly has a toggle hinge 42 for coupling to the first toggle lever 40. At the free ends, the second toggle lever 44 is rotatably mounted on the housing side via rotation axes 45.

By activating the drive motor 24, the cam disc 28 is rotated counter-clockwise, thereby pressing against the pivot lever (to the left in the drawing plane), whereby the pivot lever 18 rotates clockwise against the force of the return spring 22 and thereby moves a front end 30 of the door handle 12 upwards (in the drawing) or outwards (in the installed state) in an arc around the axis of rotation 20. Simultaneously, the pivot lever 18 pushes the push rod 32 at its hinge 33 to the left in the drawing plane, whereby the locking lever 34 rotates counter-clockwise by approximately 90° about its axis of rotation 36. Here, its locking tab 38 pushes the first toggle lever 40 upwards, whereby a locking lug 48 attached to it ensures that the toggle lever 40 is taken upwards. The upward moving toggle lever 40 pushes the rear end 31 of the door handle 12 upwards (in the drawing plane) or outwards (in the assembled state) via the rear hinge point 14. The other end of the first toggle lever 40 pulls the second toggle lever 44 upwards via the toggle hinge 42, which thereby rotates about its housing-side axis of rotation 45.

In FIG. 3, the handle device 10 is depicted in its final position, the so-called standby position, in which the door handle 12 can be grasped by a user and either pulled or pushed against it. In this standby position, the locking tab 38 extends approximately in a tangential direction with respect to a rotation about the front hinge point 16. This is because if the user exerts a pressure force D (FIG. 3) on the door handle 12, which would be downwards in the drawing plane, the door handle 12 will attempt to rotate counter-clockwise about the fixed hinge point 16, which is prevented, in that the kinematic system consisting of the two toggle levers 40, 44 and the locking tab 38 prevents this, because the locking tab 38 prevents the toggle lever 40 from moving downwards again.

On the other hand, a pulling force Z (FIG. 3) on the door handle 12, which is directed upwards in the drawing plane, is not resisted by the kinematic system, since the locking tab 38 is not fixed to the toggle lever 40 and can lift off from it, such that the door handle 12 can turn outwards about the front hinge point 16. The rotary movement is limited by the geometry of the two toggle levers 40, 44.

FIG. 4 shows the handle device 10 in the open position in perspective from the other side. Here, only one half of the door handle 12 is shown, such that its front hinge point 14 and its rear hinge point 16 can be seen. The standby position (FIG. 3) is depicted with a dashed line and designated B. In the open position, the toggle levers 40, 44 are extended to corresponding stops (not shown), such that a further pulling in the door handle 12 is transmitted as a pulling force into the support structure of the handle device 10 not shown and further into the vehicle door in order to open the vehicle door. In this opening position, the first toggle lever 40 is lifted from the locking tab 38 of the locking lever 34. When the door handle 12 is moved back from the open position to the standby position, the toggle lever 40 re-engages with the locking tab 38 of the locking lever 34 and transmits further acting force into the support structure of the handle device 10 and above into the vehicle door, in order to close the vehicle door.

Preferably, a microswitch (not shown) is applied at a suitable point, e.g., at the second toggle lever 44, which, when the second toggle lever 44 is rotated beyond the standby position shown in FIG. 3, emits a switching signal which can be used in particular to control a door lock. In addition, a connection (not shown) of a mechanical power transmission element, in particular a Bowden cable, can be provided on the door handle 12, via which the tensile force generated when pulling or rotating the door handle 12 about the front hinge point 16 is used for mechanical lock release.

Although the invention has been illustrated and explained in more detail by preferred exemplary embodiments, the invention is not restricted by the disclosed examples, and other variations can be derived from them by the person skilled in the art without leaving the scope of protection of the invention. It is therefore clear that there is a plurality of variation possibilities. It is also clear that embodiments mentioned as examples really only depict examples which are not in any way to be understood as a limitation of the scope of protection, the application possibilities or the configuration of the invention. Rather, the preceding description and the figure description enable the person skilled in the art to implement the exemplary embodiments in a concrete way, wherein the person skilled in the art, with knowledge of the disclosed invention idea, can make various changes, for example with respect to the function or the arrangement of individual elements mentioned in an exemplary embodiment, without leaving the scope of protection defined by the claims and their legal equivalents, such as further explanations in the description.

The invention claimed is:

1. A handle device for a motor vehicle door, the handle device comprising:
   an electrically driven movement kinematic system, which comprises a motor-operated pivot lever and a push rod, wherein a first end of the push rod is hinged to the motor-operated pivot lever; and
   a door handle, which is hinged at first and second ends to the electrically driven movement kinematic system such that the door handle is moveable from a retracted rest position into an extended standby position and back, wherein in the extended standby position, a compressive force acting on the door handle from outside is transferrable to the motor vehicle door, and the door handle is moveable into an opening position by a tensile force;
   wherein the first end of the door handle is rotatable outwards by the motor-operated pivot lever, a second end of the push rod is hinged to a locking lever acting on the door handle,
   wherein a first end of a first toggle lever and a first end of a second toggle lever are hingedly connected to each other by a toggle hinge, a second end of the first toggle lever is hinged to a rear hinge point of the second end of the door handle, and a second, free end of the second toggle lever is mounted on the housing side and has a rotation axis on the housing side,
   wherein the locking lever is configured to block a movement of the door handle back into the retracted rest position in the extended standby position, and to permit a movement into the opening position.

2. The handle device of claim 1, wherein the first end of the door handle is a front end of the door handle in a direction of the vehicle.

3. The handle device of claim 1, wherein the motor-operated pivot lever is rotatable about an axis of rotation fixed to the housing by a cam disc actuated by a drive motor.

4. The handle device of claim 1, wherein the locking lever has a locking tab which is rotatable during a movement from the retracted rest position to the extended standby position, wherein the locking tab abuts the first toggle lever in a sliding manner.

5. The handle device of claim 4, wherein, in the extended standby position, the locking tab is aligned in a direction of force action of the compressive force acting at a hinge point of the door handle on the first toggle lever.

6. The handle device of claim 1, wherein the hinge points of the push rod on the motor-operated pivot lever and on the locking lever are selected in such a way that a rotary movement of the motor-operated pivot lever leads to an outward synchronous movement of the door handle at both ends of the door handle.

7. The handle device of claim 1, wherein when the door handle is moved from the extended standby position into the opening position, a pivot lever-sided hinge point of the door handle remains stationary and the second end of the door handle is rotatable about the pivot level-sided hinge point.

8. A motor vehicle door, comprising:
   a handle device, comprising
   an electrically driven movement kinematic system, which comprises a motor-operated pivot lever and a push rod, wherein a first end of the push rod is hinged to the motor-operated pivot lever; and
   a door handle, which is hinged at first and second ends to the electrically driven movement kinematic system such that the door handle is moveable from a retracted rest position into an extended standby position and back, wherein in the extended standby position, a compressive force acting on the door handle from outside is transferrable to the motor vehicle door, and the door handle is moveable into an opening position by a tensile force;
   wherein the first end of the door handle is rotatable outwards by the motor-operated pivot lever, a second end of the push rod is hinged to a locking lever acting on the door handle,
   wherein a first end of a first toggle lever and a first end of a second toggle lever are hingedly connected to each other by a toggle hinge, a second end of the first toggle lever is hinged to a rear hinge point of the second end of the door handle, and a second, free end of the second toggle lever is mounted on the housing side and has a rotation axis on the housing side,
   wherein the locking lever is configured to block a movement of the door handle back into the retracted rest position in the extended standby position, and to permit a movement into the opening position.

9. The motor vehicle door of claim 8, wherein the first end of the door handle is a front end of the door handle in a direction of the vehicle.

10. The motor vehicle door of claim 8, wherein the motor-operated pivot lever is rotatable about an axis of rotation fixed to the housing by a cam disc actuated by a drive motor.

11. The motor vehicle door of claim 8, wherein the locking lever has a locking tab which is rotatable during a movement from the retracted rest position to the extended standby position, wherein the locking tab abuts the first toggle lever in a sliding manner.

12. The motor vehicle door of claim 11, wherein, in the extended standby position, the locking tab is aligned in a direction of force action of the compressive force acting at a hinge point of the door handle on the first toggle lever.

13. The motor vehicle door of claim 8, wherein the hinge points of the push rod on the motor-operated pivot lever and on the locking lever are selected in such a way that a rotary movement of the motor-operated pivot lever leads to an outward synchronous movement of the door handle at both ends of the door handle.

14. The motor vehicle door of claim 8, wherein when the door handle is moved from the extended standby position into the opening position, a pivot lever-sided hinge point of the door handle remains stationary and the second end of the door handle is rotatable about the pivot level-sided hinge point.

* * * * *